United States Patent [19]

Spangler et al.

[11] 4,337,842
[45] Jul. 6, 1982

[54] VEHICLE POWERED BY AIR PRESSURE ENGINE

[76] Inventors: Ray P. Spangler, c/o George Spector 3615 Woolworth Bldg., 233 Broadway; George Spector, 3615 Woolworth Bldg.,, both of New York, N.Y. 10007

[21] Appl. No.: 123,196

[22] Filed: Feb. 20, 1980

[51] Int. Cl.³ ............................................. B60K 3/00
[52] U.S. Cl. ................................... 180/302; 60/407; 105/65; 220/85 B
[58] Field of Search ................ 180/302, 165; 105/65, 105/64 R, 63; 60/407, 408, 412; 220/85 B, 3; 188/2 R

[56] References Cited

U.S. PATENT DOCUMENTS

| | | | |
|---|---|---|---|
| 819,653 | 5/1906 | Hawke | 180/302 X |
| 1,902,124 | 3/1933 | Halloran | 180/302 |
| 1,984,413 | 12/1934 | Lee | 188/2 R |
| 2,056,942 | 10/1936 | Krueger | 188/2 R X |
| 2,839,269 | 6/1958 | Gillen | 180/302 X |
| 3,270,905 | 9/1966 | Kroekel | 220/3 |
| 4,043,126 | 8/1977 | Santos | 60/407 |

*Primary Examiner*—Joseph F. Peters, Jr.
*Assistant Examiner*—Milton L. Smith

[57] ABSTRACT

An automotive vehicle that is powered by compressed air instead of by gasoline; the vehicle including air tanks that are filled with compressed air, while controls on a dashboard operate valves for flowing the air into cylinders of the vehicle engine in order to run the same.

2 Claims, 3 Drawing Figures

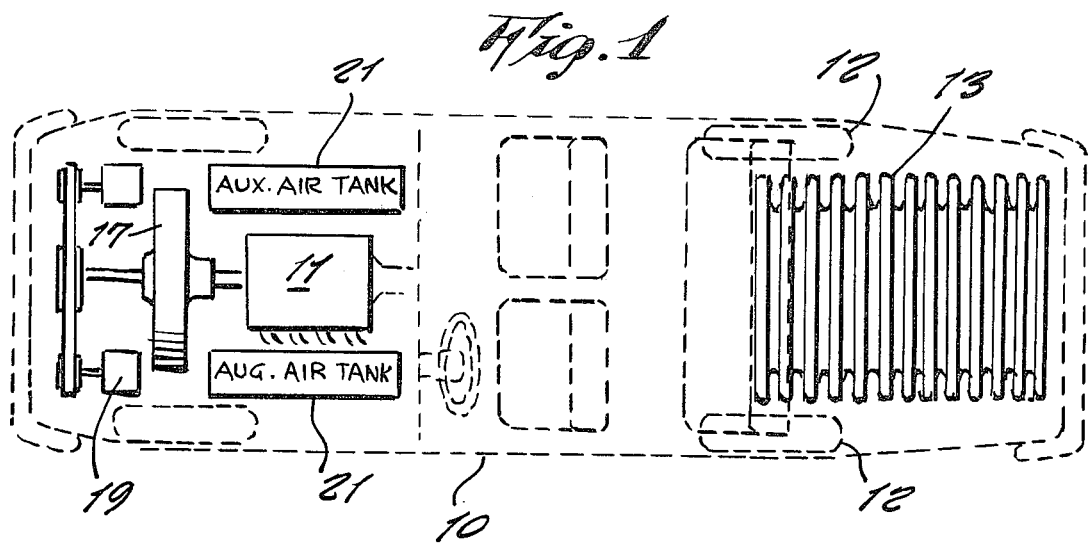
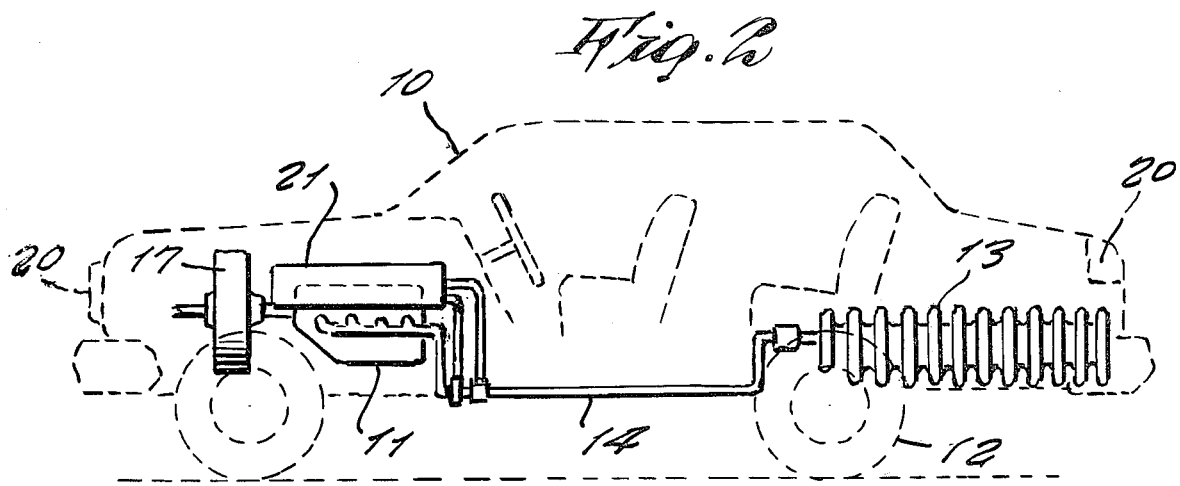
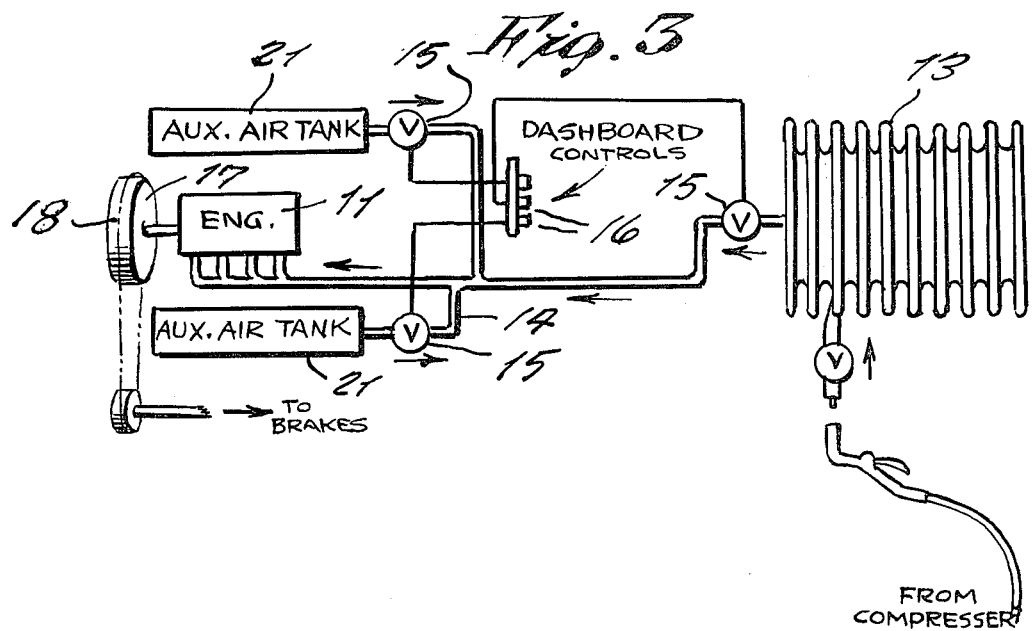

VEHICLE POWERED BY AIR PRESSURE ENGINE

This invention relates generally to automotive vehicles.

It is well known that at this time there is a great concern about the shortage of fossil fuel for powering engines, particularly those of automotive vehicles so that there is an interest in finding a new type of power for running the same.

It is a principal object of the present invention, to provide an engine which is powered by compressed air pressure instead of by burning gasoline, in view of its limitless supply and ease to obtain, so as to be inexpensive.

Another object is to provide an air pressure engine that would eliminate the pollution of the atmosphere produced by gasoline burning engines.

Still a further object is to provide an air pressure engine that would be particularly ideal for use by automotive vehicles which would carry compressed air tanks instead of gasoline tanks, and which would be filled with air at automobile service stations.

Still a further object is to provide an air pressure engine which would make the vehicle less heavy by carrying compressed air instead of gasoline, and would also be safer against any fire.

Still a further object is to provide an air pressure engine which could be adaptable for powering a boat, or a railroad train in which case a large tender behind the engine would carry a large air tank instead of the old coal carrying tender or the Diesel Oil Tanks.

FIG. 1 is a top view of a car incorporating the invention, and showing that the main air fuel tank is stretchable so that air pressure therein is retained longer as the air is used up, thus giving the car a greater mileage than from a non-stretchable tank wherein air pressure drops quicker after some of the air is used.

FIG. 2 is a side view of the car.

FIG. 3 is an operational diagram of the invention.

Referring now to the drawing in greater detail, the reference numeral 10 represents an automotive vehicle which includes a reciprocal or rotary engine 11 for delivering mechanical movement to the vehicle drive wheels 12.

The engine would incorporate the general features of a gasoline powered engine by including either reciprocal pistons or a rotor, but pressure for moving them would be obtained by air pressure inside the engine cylinders. A conventional ignition circuit would of course be completely eliminated, so that the engine would have less parts so as to be less expensive and have less possibility of breaking down.

The tanks for supplying compressed air to the engine could be made expandable such as the accordian pleated tank 13 which is made of flexible material and contracts automatically at lowering pressure.

Supply of air to the engine will be through pipes 14 from the tanks, the pipes being intercepted by valves 15 that are controlled by knobs 16 on the dashboard so as to regulate the air volume rate and thus regulate the vehicle speed.

A fly wheel 17 shown mounted on the engine crankshaft, for smooth engine operation, may include a brake lining 18 therearound for use in braking the vehicle travel, and in conjunction with the regular oil powered brakes of the vehicle.

A compressor 19 driven by engine 11 (FIG. 1) drives a charger for a battery (not shown) providing power for the vehicle conventional lights 20, and as an aid in starting the engine in case the tank air pressure is insufficient to do so.

The stretchable air tank of the present invention will serve to prevent a drop in air pressure for a greater time, so as to be more efficient. However, conventional tanks may be utilized, such as the auxiliary air tanks 21 that may be located in any available vacant space of the vehicle, so that the cruising range of the vehicle may be extended.

It is to be noted that the less expensive power thus used to run the vehicle, would permit installation of compressed air pumps at closer intervals along a highway so that motorists could help themselves to keep the air pressure up, such pumps being coin operated so to not require a service station attendant.

What is claimed as new, is:

1. A vehicle, comprising in combination, a compression operated engine on said vehicle driving a flywheel and the vehicular wheels, a pipe between said engine and a compression power source, said power source comprising a supply tank containing compressed air, and means whereby a high compression is maintained in said tank while said air is removed therefrom to said engine, wherein said means comprises said compressed air tank being expandable wherein a valve along said pipe is controlled by a knob on a dashboard of said vehicle for air volumerate control to said engine wherein a brake lining is provided around said flywheel in combination with a brake system of said vehicle.

2. A vehicle as in claim 1 wherein said flywheel is mounted on a shaft that drives a compressor for use in charging a battery including auxiliary air tanks communicating with said pipe via valves air lines.

* * * * *